(12) United States Patent
Dai et al.

(10) Patent No.: US 12,176,691 B2
(45) Date of Patent: Dec. 24, 2024

(54) REVERSIBLE THERMOSENSITIVE EARLY-WARNING ENVIRONMENT-FRIENDLY FLAME-RETARDANT PROTECTIVE SLEEVE

(71) Applicant: ANHUI EFARAD ELECTRIC POWER TECHNOLOGY CO., LTD., Anhui (CN)

(72) Inventors: Wenzhong Dai, Anhui (CN); Nikolai Konkodievich Zaitsev, Anhui (CN); Wenzong Xu, Anhui (CN); Youqun Wang, Anhui (CN); Mian Dai, Anhui (CN); Zhang Dai, Anhui (CN); Yujuan Wu, Anhui (CN); Chao Dai, Anhui (CN); Liang Li, Anhui (CN)

(73) Assignee: Anhui Efarad Electric Power Technology Co., Ltd, Anhui (CN)

( * ) Notice: Subject to any disclaimer, the term of this patent is extended or adjusted under 35 U.S.C. 154(b) by 284 days.

(21) Appl. No.: 17/926,945

(22) PCT Filed: Nov. 2, 2021

(86) PCT No.: PCT/CN2021/128183
§ 371 (c)(1),
(2) Date: Nov. 21, 2022

(87) PCT Pub. No.: WO2022/105594
PCT Pub. Date: May 27, 2022

(65) Prior Publication Data
US 2023/0198236 A1    Jun. 22, 2023

(30) Foreign Application Priority Data
Nov. 17, 2020  (CN) .......................... 202011288251.6

(51) Int. Cl.
*H02G 3/04*    (2006.01)
*A62C 3/16*    (2006.01)
*G08B 17/06*   (2006.01)

(52) U.S. Cl.
CPC ............. *H02G 3/0412* (2013.01); *A62C 3/16* (2013.01); *G08B 17/06* (2013.01)

(58) Field of Classification Search
CPC .... H02G 3/0412; H02G 3/0406; H01B 7/295; A62C 3/16; A62C 2/065;
(Continued)

(56) References Cited

U.S. PATENT DOCUMENTS

2008/0217043 A1   9/2008   Schoke et al.
2014/0305666 A1*  10/2014  Cordani ................... A62C 3/16
                                                            169/46
2020/0203939 A1*  6/2020   Gooding ............... H02G 3/0481

FOREIGN PATENT DOCUMENTS

CN        208256336 U    12/2018
CN        109461531 A    3/2019
(Continued)

OTHER PUBLICATIONS

International Search Report for PCT Application No. PCT/CN2021/128183, dated Feb. 10, 2022, in 2 pages.

*Primary Examiner* — Roshn K Varghese
(74) *Attorney, Agent, or Firm* — Knobbe Martens Olson & Bear LLP

(57) ABSTRACT

A reversible thermosensitive early-warning environment-friendly flame-retardant protective sleeve is provided, which includes an outer protective sleeve. A cushioning mounting block is mounted on one side of the outer protective sleeve. A flame-retardant layer is provided on a surface of the cushioning mounting block. A first splicing block and a second splicing block are mounted on an inner wall of the outer protective sleeve. Expansion blocks are mounted on (Continued)

surfaces of both the first splicing block and the second splicing block. A sharp block is mounted at a bottom of each of the expansion blocks. A flame-retardant device is provided at a bottom of the sharp block.

7 Claims, 4 Drawing Sheets

(58) Field of Classification Search
CPC .............. A62C 2/241–245; G08B 17/06;
G08B 17/02; G08B 3/10; G08B 21/24;
Y02A 30/00; Y02A 30/14
See application file for complete search history.

(56) References Cited

FOREIGN PATENT DOCUMENTS

| | | |
|---|---|---|
| CN | 211578439 U | 9/2020 |
| CN | 211604727 U | 9/2020 |
| CN | 112366626 A | 2/2021 |

\* cited by examiner

REVERSIBLE THERMOSENSITIVE EARLY-WARNING ENVIRONMENT-FRIENDLY FLAME-RETARDANT PROTECTIVE SLEEVE

CROSS REFERENCE TO RELATED APPLICATION

This application is a national stage application of International Patent Application No. PCT/CN2021/128183, filed on Nov. 2, 2021, which claims priority to Chinese Patent Application No. 202011288251.6 titled "REVERSIBLE THERMOSENSITIVE EARLY-WARNING ENVIRONMENT-FRIENDLY FLAME-RETARDANT PROTECTIVE SLEEVE," filed with the Chinese Patent Office on Nov. 17, 2020, each of which is incorporated herein by reference in its entirety.

TECHNICAL FIELD

The present disclosure relates to the technical field of protective sleeves, in particular to a reversible thermosensitive early-warning environment-friendly flame-retardant protective sleeve.

BACKGROUND

A protective sleeve is an essential protective device mounted on a surface of a cable or a high-voltage wire. High-voltage wires and cables play an important role in daily life and play an important role in electric power and communication in daily life. However, when the high-voltage wire or the cable is used in daily life, the voltage of the high-voltage wire or the cable is too high, so that a fire disaster is easy to occur in high-temperature weather or short-circuit conditions. If fire disaster occurs, early warning is not generated in time, a large amount of losses are caused, and the losses not only waste national economy but also affect the daily life requirements of people.

The existing protective sleeves have a fireproof protection function through external materials thereof. Although the existing protective sleeves also have a certain fireproof effect, but the existing protective sleeves are not good in effect and cannot take a certain fire-extinguishing measure. Meanwhile, people nearby cannot be reminded of quickly finding out danger when the fire happens. Therefore, a reversible thermosensitive early-warning environment-friendly flame-retardant protective sleeve is provided.

SUMMARY

The embodiments aim to provide a reversible thermosensitive early-warning environment-friendly flame-retardant protective sleeve which can effectively solve the problems that the existing protective sleeves in the background art cannot take a certain fire-extinguishing measure on fire and cannot remind people nearby when the fire occurs, so that the people can quickly find out dangers.

In order to achieve the above mentioned purpose, the present disclosure provides the following scheme.

The present disclosure provides a reversible thermosensitive early-warning environment-friendly flame-retardant protective sleeve, which includes an outer protective sleeve. A cushioning mounting block is mounted on an inner side of the outer protective sleeve. A flame-retardant layer is provided on a surface of the cushioning mounting block. A first splicing block and a second splicing block are mounted on an inner wall of the outer protective sleeve respectively. Expansion blocks are each mounted on a surface of a corresponding one of the first splicing block and the second splicing block. A sharp block is mounted at a bottom of each of the expansion blocks. A flame-retardant device is provided at a bottom of the sharp block.

In some embodiments, the flame-retardant device may be of a sealed structure. Sand stone particles may be in the flame-retardant device. An extrusion block may be mounted on one side of a top of the flame-retardant device. A position of the extrusion block may correspond to a position of the sharp block. A connector may be mounted on an inner wall of one side of the flame-retardant device. A micro balloon may be mounted at one end of the connector. A small glass bottle may be mounted at an other end of the connector. The small glass bottle may communicate with an interior of the micro balloon through the connector. A clamping plug may be further mounted inside the flame-retardant device. An end of a pulling strip may be mounted at a bottom of the clamping plug.

In some embodiments, multiple first sliding grooves may be formed in one side of the first splicing block. Multiple second sliding grooves may be formed in one side of the second splicing block. A mounting strip may be connected between each of the first sliding grooves and a corresponding one of the second sliding grooves. A limiting strip may be mounted at each of two ends of the mounting strip. A length of the limiting strip may be larger than a length of the first sliding groove and a length of the second sliding groove. The flame-retardant devices may be mounted correspondingly at the first sliding groove and the second sliding groove respectively. An other end of the pulling strip may be connected with the limiting strip at a corresponding position.

In some embodiments, multiple open grooves may be formed in one side of the outer protective sleeve. Multiple clamping grooves may be formed in an other side of the outer protective sleeve. The clamping grooves may have a same number as the open grooves. Two ends of each of the clamping grooves may be mounted with protruding blocks respectively. A soft rotating strip may be mounted at a joint of the clamping groove and the outer protective sleeve.

In some embodiments, empty grooves may be formed in two sides of an interior of the outer protective sleeve. Elastic strips may be mounted on two sides of the cushioning mounting block respectively. The elastic strip may be in an L shape. Each of the elastic strips may be mounted inside a corresponding one of the empty grooves.

In some embodiments, an end of each of two connecting blocks may be further mounted on a corresponding one of two sides of a bottom of the cushioning mounting block. An other end of the connecting block may be connected with a top of a corresponding one of the elastic strips which is opposite to the connecting block. A circuit board may be mounted at the bottom of the cushioning mounting block. An alarm may be provided on a surface of the circuit board. A connecting wire may be provided on the surface of the circuit board. Each of two ends of the connecting wire may be connected with one side of a corresponding one of the two connecting blocks.

In some embodiments, a trip protection circuit may be provided on the surface of the circuit board which may include a loudspeaker and a silicon controlled rectifier. One end of the loudspeaker LS1 may be connected with one end of a resistor R1 and one end of a resistor R2. An other end of the resistor R2 may be connected with an other end of the resistor R1 and one of the two ends of the connecting wire. An other end of the loudspeaker LS1 may be connected with a positive electrode of the silicon controlled rectifier VD1. A negative electrode of the silicon controlled rectifier VD1 may be connected with a negative electrode of a power supply E. A positive electrode of the power supply E may be connected with one end of a switch S1. An other end of the switch S1 may be connected with one end of the loudspeaker LS1 and the resistor R1. A control electrode of the silicon controlled rectifier VD1 may be connected with an other one of the two ends of the connecting wire and one end of the resistor R2.

Compared with the prior art, the embodiments have the following beneficial technical effects.

Firstly, the first splicing block and the second splicing block can be separated by means of the expansion blocks when a fire occurs, and the expansion of the expansion blocks enable the sharp blocks to move downwards to extrude sand stone particles. So, the small glass bottle is subjected to external thermal expansion, the micro balloon is driven by the connector to expand, and the micro balloon is expanded to extrude the sand stone particles. After the sand stone particles are subjected to the extrusion of the sharp blocks and the micro balloons, the clamping plugs are extruded, and the sand stone particles fall off, so that the certain fire-extinguishing effect can be achieved on the fire.

Secondly, an alarm siren can be given when the circuit is interrupted through the circuit board and the alarm. When the connecting wire is not broken, no matter whether voltage or current exists in an external circuit, the silicon controlled rectifier is kept in a cut-off state and an alarm siren is not sounded. When the connecting wire is broken, the silicon controlled rectifier is conducted to form the alarm siren when high voltage occurs in the control electrode of the silicon controlled rectifier. The alarm can sound an alarm siren to remind people nearby, the spread of fire is further avoided, and the fire can be restrained when the fire is very small.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Figure 1:
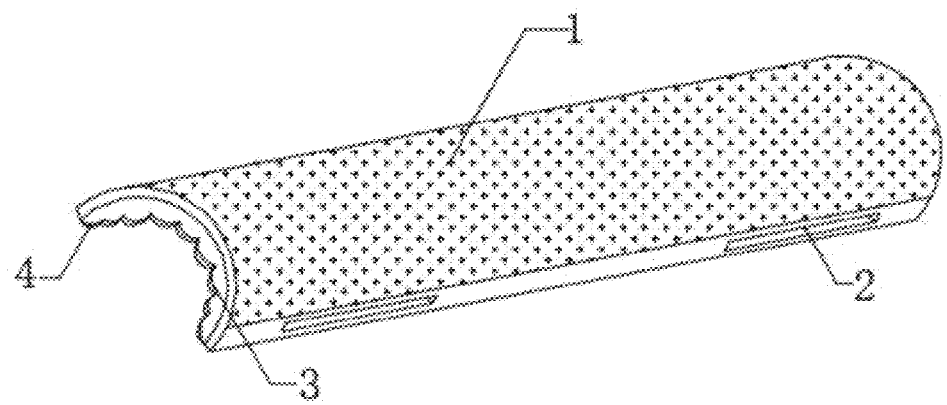
FIG. 1 is an integral structural schematic diagram of a reversible thermosensitive early-warning environment-friendly flame-retardant protective sleeve according to the present disclosure.

List of the reference characters: 1 outer protective sleeve; 2 open groove; 3 cushioning mounting block; 4 flame-retardant layer; 5 clamping groove; 6 protruding block; 7 soft rotating strip; 8 expansion block; 9 flame-retardant device; 10 limiting strip; 11 first sliding groove; 12 mounting strip; 13 second sliding groove; 14 first splicing block; 15 second splicing block; 16 sharp block; 17 sand stone particle; 18 extrusion block; 19 micro balloon; 20 connector; 21 small glass bottle; 22 clamping plug; 23 pulling strip; 24 empty groove; 25 circuit board; 26 alarm; 27 connecting wire; 28 connecting block; and 29 elastic strip.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The embodiments aim to provide a reversible thermosensitive early-warning environment-friendly flame-retardant protective sleeve so as to solve the problems in the prior art.

To make the foregoing purpose, features and advantages of the present disclosure clearer and more comprehensible, the present disclosure is further described in detail below with reference to the attached figures and specific embodiments.

Embodiment I

Figure 2:
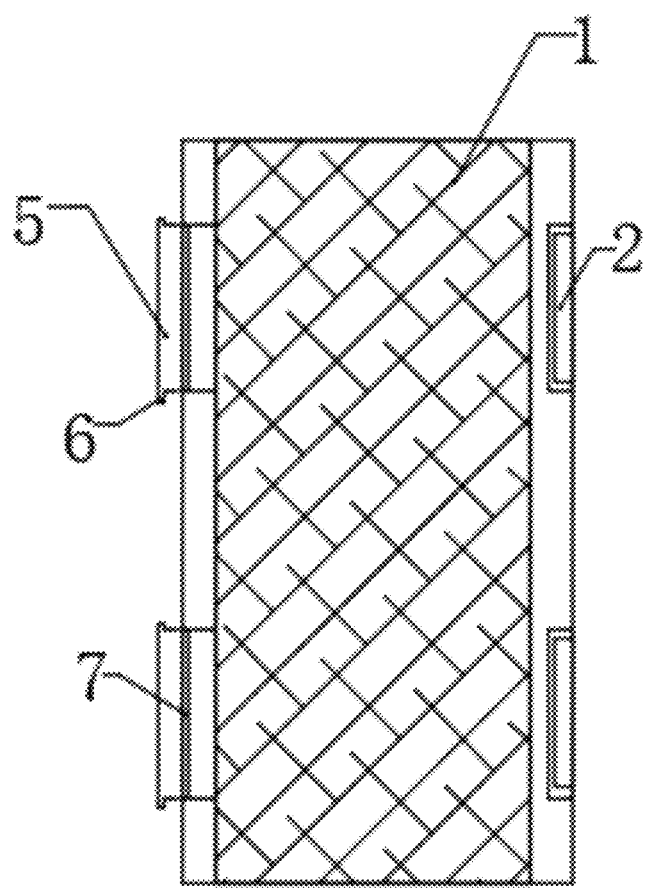
FIG. 2 is a top view of the reversible thermosensitive early-warning environment-friendly flame-retardant protective sleeve according to the present disclosure.
Figure 3:
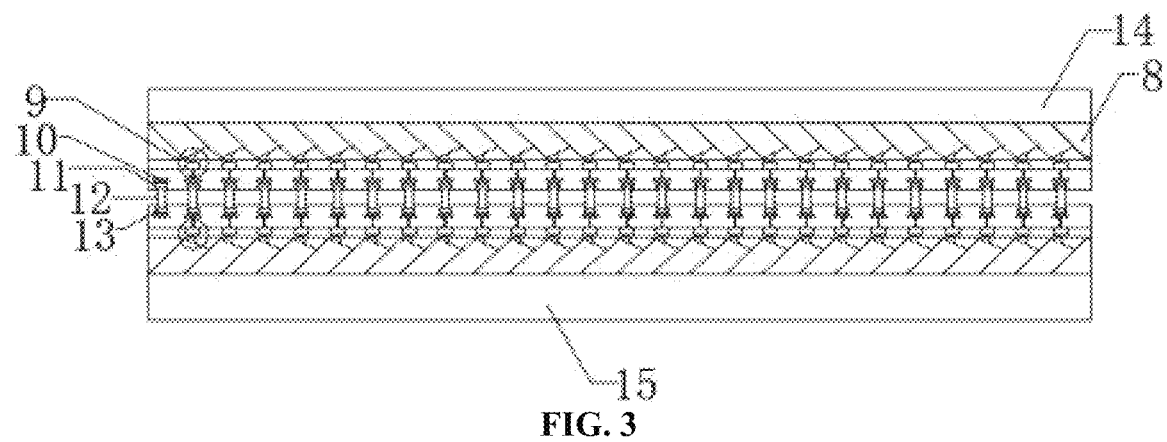
FIG. 3 is a bottom view of the reversible thermosensitive early-warning environment-friendly flame-retardant protective sleeve according to the present disclosure.
Figure 4:
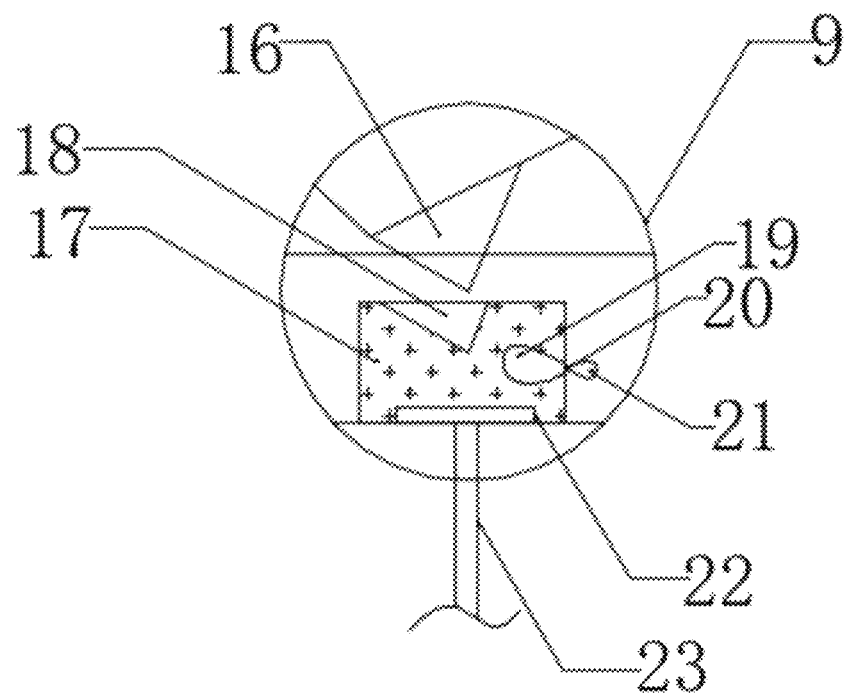
FIG. 4 is a structural schematic diagram of a flame-retardant device of a reversible thermosensitive early-warning environment-friendly flame-retardant protective sleeve according to the present disclosure.
Figure 5:
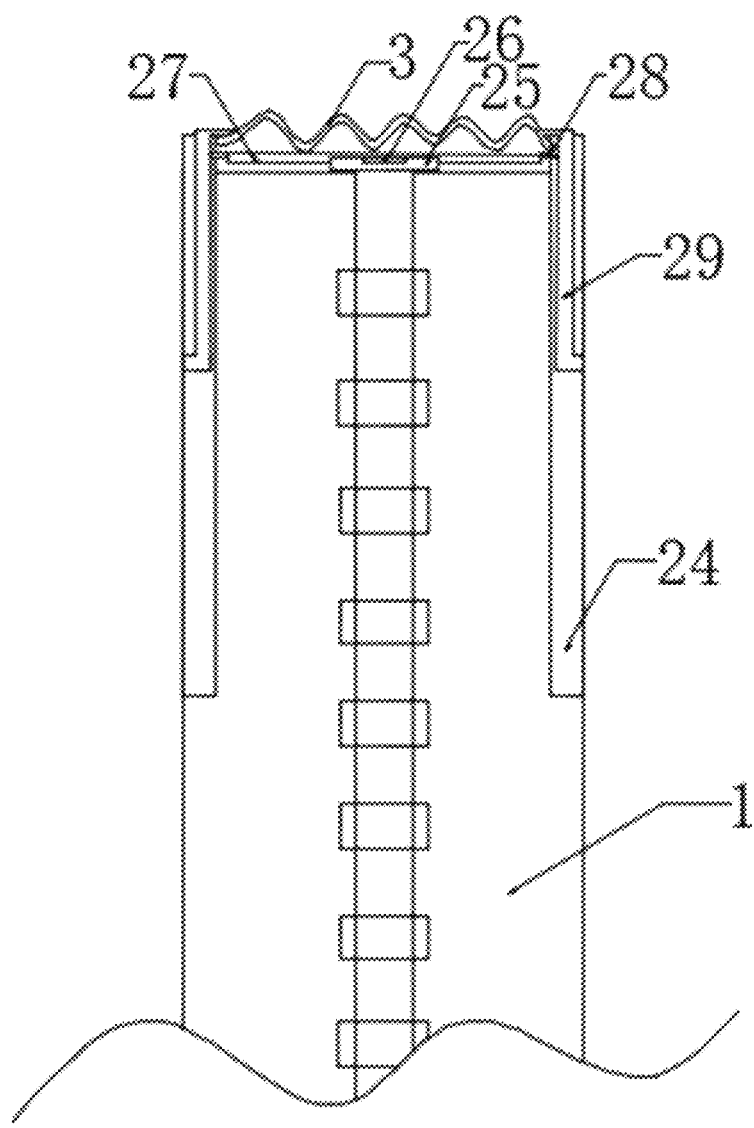
FIG. 5 is a section view of the reversible thermosensitive early-warning environment-friendly flame-retardant protective sleeve according to the present disclosure.
Figure 6:
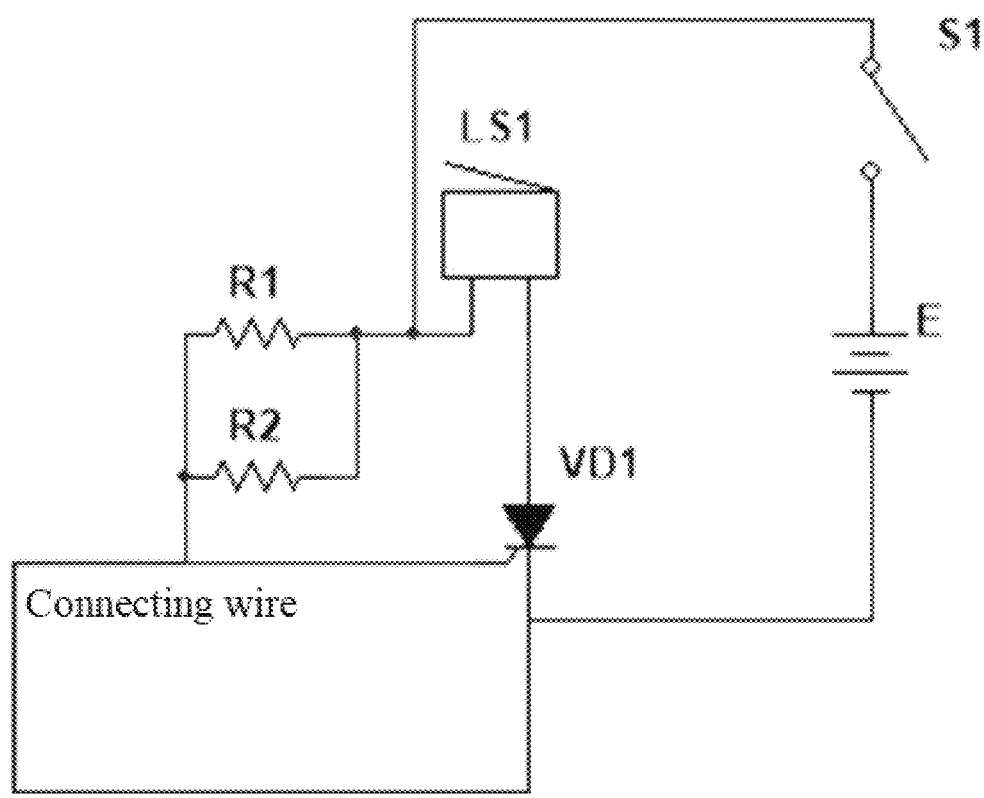
FIG. 6 is a circuit diagram of a trip protection circuit of the reversible thermosensitive early-warning environment-friendly flame-retardant protective sleeve according to the present disclosure.

As shown in FIG. 1 to FIG. 6, a reversible thermosensitive early-warning environment-friendly flame-retardant protective sleeve includes an outer protective sleeve 1. A cushioning mounting block 3 is mounted on an inner side of the outer protective sleeve 1. A flame-retardant layer 4 is provided on a surface of the cushioning mounting block 3. A first splicing block 14 and a second splicing block 15 are mounted on an inner wall of the outer protective sleeve 1 respectively. Expansion blocks 8 are each mounted on a surface of a corresponding one of the first splicing block 14 and the second splicing block 15. A sharp block 16 is mounted at a bottom of each expansion block 8. A flame-retardant device 9 is provided at a bottom of each sharp block 16. The cushioning mounting block 3 may play a role in cushioning at a joint of the protective sleeve and the circuit when the protective sleeve is mounted. The flame-retardant layer 4 may play a flame-retardant effect to a certain extent. The first splicing block 14 and the second splicing block 15 are connected with each other and may expand to generate displacement on a surface of the mounting strip 12 when being subjected to heat of fire.

The flame-retardant device 9 is of a sealed structure. Sand stone particles 17 are in the flame-retardant device 9. An extrusion block 18 is mounted on one side of a top of the flame-retardant device 9. A position of the extrusion block 18 corresponds to a position of the sharp block 16. A connector 20 is mounted on an inner wall of one side of the flame-retardant device 9. A micro balloon 19 is mounted at one end of the connector 20. A small glass bottle 21 is mounted at the other end of the connector 20. The small glass bottle 21 communicates with an interior of the micro balloon 19 through the connector 20. A clamping plug 22 is further mounted inside the flame-retardant device 9. An end of a pulling strip 23 is mounted at a bottom of the clamping plug 22. The flame-retardant device 9 may extrude the sand stone particles 17 through the expansion of the micro balloon 19 and the sharp blocks 16, the sand stone particles 17 extrude away the clamping plugs 22 under the extrusion, the sand stone particles 17 fall off, and the sand stone particles 17 play a certain fire-extinguishing effect.

Multiple first sliding grooves 11 are formed in one side of the first splicing block 14. Multiple second sliding grooves 13 are formed in one side of the second splicing block 15. A mounting strip 12 is connected between the first sliding groove 11 and the second sliding groove 13. A limiting strip 10 is mounted at each of two ends of the mounting strip 12. A length of the limiting strip 10 is larger than a length of the first sliding groove 11 and a length of the second sliding groove 13. The flame-retardant devices 9 are mounted correspondingly at the first sliding groove 11 and the second sliding groove 13 respectively. The other end of the pulling strip 23 is connected with the limiting strip 10 at a corresponding position. When the expansion block 8 is heated and expanded, the first splicing block 14 and the second splicing block 15 may slide towards two sides to generate displacement, through the first sliding groove 11 and the second sliding groove 13 on the surface of the mounting strip 12. So the first splicing block 14 and the second splicing block 15 deviate towards the two sides to generate a gap, and the sand stone particles 17 may conveniently fall outwards from the gap.

Multiple open grooves 2 are formed in one side of the outer protective sleeve 2. Multiple clamping grooves 5 are formed in the other side of the outer protective sleeve 1. The clamping grooves 5 have the same number as the open grooves 2. Two ends of each clamping groove 5 are mounted with protruding blocks 6 respectively. A soft rotating strip 7 is mounted at a joint of the clamping groove 5 and the outer protective sleeve 1. The groove 2 and the clamping groove 5 may be matched with each other in a one-to-one correspondence, so as to protect a corresponding circuit. When multiple circuits are arranged side by side and are not convenient to move, the multiple circuits can be protected through the splicing of the multiple outer protective sleeves 1, and thus the fixed wires can be conveniently spliced.

Empty grooves 24 are formed in two sides of an interior of the outer protective sleeve 1. Elastic strips 29 are mounted on two sides of the cushioning mounting block 3 respectively. The elastic strip 29 is in an L shape. Each of the elastic strips 29 is mounted inside a corresponding one of the empty grooves 24. Two elastic strips 29 may be pinched to mount inside the empty grooves 24 during mounting, so that the circuit board 25 may be replaced conveniently, and the cushioning mounting block 3 may be mounted at a proper mounting position conveniently.

An end of each of two connecting blocks 28 is further mounted on a corresponding one of two sides of a bottom of the cushioning mounting block 3. The other end of the connecting block 28 is connected with a top of a corresponding one of the elastic strips 29 which is opposite to the connecting block 28. A circuit board 25 is mounted at the bottom of the cushioning mounting block 3. An alarm 26 is provided on a surface of the circuit board 25. A connecting wire 27 is provided on the surface of the circuit board 25. Each of two ends of the connecting wire 27 is connected with one side of a corresponding one of the two connecting blocks 28.

According to the above technical scheme, the first splicing block 14 and the second splicing block 15 may be separated by means of the expansion blocks 8 when a fire occurs, and the expansion of the arranged expansion blocks 8 enable the sharp blocks 16 to move downwards to extrude sand stone particles 17. So, the small glass bottle 21 is subjected to external thermal expansion, the micro balloon 19 is driven by the connector 20 to expand, and the micro balloon 19 is expanded to extrude the sand stone particles 17. After the sand stone particles 17 are subjected to the extrusion of the sharp blocks 16 and the micro balloons 19, the clamping plugs 22 are extruded, and the sand stone particles 17 fall off, so that the certain fire-extinguishing effect can be achieved on the fire.

Embodiment II

As shown in FIG. 1 to FIG. 6, a reversible thermosensitive early-warning environment-friendly flame-retardant protective sleeve includes an outer protective sleeve 1. A cushioning mounting block 3 is mounted on an inner side of the outer protective sleeve 1. A flame-retardant layer 4 is provided on a surface of the cushioning mounting block 3. A first splicing block 14 and a second splicing block 15 are mounted on an inner wall of the outer protective sleeve 1. Expansion blocks 8 are each mounted on a surface of a corresponding one of the first splicing block 14 and the second splicing block 15. A sharp block 16 is mounted at a bottom of each expansion block 8. A flame-retardant device 9 is provided at a bottom of the sharp block 16.

An end of each of two connecting blocks 28 is further mounted on a corresponding one of two sides of a bottom of the cushioning mounting block 3. The other end of the connecting block 28 is connected with a top of a corresponding one of the elastic strips 29 which is opposite to the connecting block 28. A circuit board 25 is mounted at the bottom of the cushioning mounting block 3. An alarm 26 is provided on a surface of the circuit board 25. A connecting wire 27 is provided on the surface of the circuit board 25. Each of two ends of the connecting wire 27 is connected with one side of a corresponding one of the two connecting blocks 28.

A trip protection circuit is provided on the surface of the circuit board 25 which includes a loudspeaker and a silicon controlled rectifier. One end of the loudspeaker LS1 is connected with one end of a resistor R1 and one end of a resistor R2. The other end of the resistor R2 is connected with the other end of the resistor R1 and one of the two ends of the connecting wire. The other end of the loudspeaker LS1 is connected with a positive electrode of the silicon controlled rectifier VD1. A negative electrode of the silicon controlled rectifier VD1 is connected with a negative electrode of a power supply E. A positive electrode of the power supply E is connected with one end of a switch S1. The other end of the switch S1 is connected with one end of the loudspeaker LS1 and the resistor R1. A control electrode of the silicon controlled rectifier VD1 is connected with the other one of the two ends of the connecting wire and one end of the resistor R2.

According to the above technical scheme, an alarm siren can be sounded when the circuit is interrupted through the circuit board 25 and the alarm 26. When the connecting wire is not broken, no matter whether voltage or current exists in an external circuit, the silicon controlled rectifier is kept in a cut-off state and the alarm siren is not sounded. When the connecting wire 27 is broken by fire, the silicon controlled rectifier is conducted to form the alarm siren when high voltage occurs in the control electrode of the silicon controlled rectifier. The alarm 26 can sound an alarm siren to remind people nearby, the spread of fire is further avoided, and the fire can be restrained when the fire is very small.

It needs to be noted that when the reversible thermosensitive early-warning environment-friendly flame-retardant protective sleeve is used, the groove 2 and the clamping groove 5 may be matched with each other to protect a single circuit. When the multiple circuits are arranged side by side, the circuits are not convenient to move, the multiple circuits may be protected through the splicing of the multiple outer protective sleeves 1, and the fixed wires may be conveniently spliced. If the fire occurs, the cushioning mounting block 3 may play a role in cushioning at the joint of the protective sleeve and the circuit when the protective sleeve is mounted, the flame-retardant layer 4 may play a flame-retardant effect to a certain extent, and the first splicing block 14 and the second splicing block 15 are connected with each other and may expand to generate displacement on the surface of the mounting strip 12 when being subjected to heat of fire. When the expansion block 8 is heated and expanded, the first splicing block 14 and the second splicing block 15 may slide towards the two sides to generate displacement, through sliding of the first sliding groove 11 and the second sliding groove 13 on the surface of the mounting strip 12. So, the first splicing block 14 and the second splicing block 15 deviate to the two sides to generate a gap. At the moment, the flame-retardant device 9 may extrude the sand stone particles 17 through the expansion of the micro balloon 19 and the sharp blocks 16, the sand stone particles 17 extrude away the clamping plugs 22 under the extrusion, and the sand stone particles 17 fall off. The sand stone particles 17 play a certain fire-extinguishing effect. The two elastic strips 29 may be pinched to mount inside the empty grooves 24 during mounting, so that the circuit board 25 may be replaced conveniently, and the cushioning mounting block 3 may be mounted at a proper mounting position conveniently. When the connecting wire 27 is broken by the fire, the silicon controlled rectifier is conducted to form the alarm siren when high voltage occurs in the control electrode of the silicon controlled rectifier. The alarm 26 may sound an alarm siren to remind people nearby, the spread of fire is further avoided, and the fire may be restrained when the fire is very small. When the connecting wire is not broken, no matter whether voltage or current exists in an external circuit, the silicon controlled rectifier is kept in a cut-off state and an alarm siren is not sounded.

Several examples are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A reversible thermosensitive early-warning environment-friendly flame-retardant protective sleeve, comprising:
   an outer protective sleeve, wherein a cushioning mounting block is mounted on an inner side of the outer protective sleeve,
   a flame-retardant layer provided on a surface of the cushioning mounting block,
   a first splicing block and a second splicing block mounted on an inner wall of the outer protective sleeve respectively,
   expansion blocks each mounted on a surface of a corresponding one of the first splicing block and the second splicing block,
   a sharp block mounted at a bottom of each of the expansion blocks, and
   a flame-retardant device provided at a bottom of the sharp block.

2. The reversible thermosensitive early-warning environment-friendly flame-retardant protective sleeve according to claim 1, wherein the flame-retardant device is of a sealed structure, sand stone particles are in the flame-retardant device, an extrusion block is mounted on one side of a top of the flame-retardant device, a position of the extrusion block corresponds to a position of the sharp block, a connector is mounted on an inner wall of one side of the flame-retardant device, a micro balloon is mounted at one end of the connector, a small glass bottle is mounted at an other end of the connector, the small glass bottle communicates with an interior of the micro balloon through the connector, a clamping plug is further mounted inside the flame-retardant device, and an end of a pulling strip is mounted at a bottom of the clamping plug.

3. The reversible thermosensitive early-warning environment-friendly flame-retardant protective sleeve according to claim 2, wherein a plurality of first sliding grooves are formed in one side of the first splicing block, a plurality of second sliding grooves are formed in one side of the second splicing block, a mounting strip is connected between each of the first sliding grooves and a corresponding one of the second sliding grooves, a limiting strip is mounted at each of two ends of the mounting strip, a length of the limiting strip is larger than a length of the first sliding groove and a length of the second sliding groove; the flame-retardant devices are mounted correspondingly at the first sliding groove and the second sliding groove respectively, and an other end of the pulling strip is connected with the limiting strip at a corresponding position.

4. The reversible thermosensitive early-warning environment-friendly flame-retardant protective sleeve according to claim 1, wherein a plurality of open grooves are formed in one side of the outer protective sleeve, a plurality of clamping grooves are formed in an other side of the outer protective sleeve, the clamping grooves have a same number as the open grooves, two ends of each of the clamping grooves are mounted with protruding blocks respectively, and a soft rotating strip is mounted at a joint of the clamping groove and the outer protective sleeve.

5. The reversible thermosensitive early-warning environment-friendly flame-retardant protective sleeve according to claim 1, wherein empty grooves are formed in two sides of an interior of the outer protective sleeve, elastic strips are mounted on two sides of the cushioning mounting block respectively, the elastic strip is in an L shape, and each of the elastic strips is mounted inside a corresponding one of the empty grooves.

6. The reversible thermosensitive early-warning environment-friendly flame-retardant protective sleeve according to claim 5, wherein an end of each of two connecting blocks is further mounted on a corresponding one of two sides of a bottom of the cushioning mounting block, an other end of the connecting block is connected with a top of a corresponding one of the elastic strips which is opposite to the connecting block, a circuit board is mounted at the bottom of the cushioning mounting block, an alarm is provided on a surface of the circuit board, a connecting wire is provided on the surface of the circuit board, and each of two ends of the connecting wire is connected with one side of a corresponding one of the two connecting blocks.

7. The reversible thermosensitive early-warning environment-friendly flame-retardant protective sleeve according to claim 6, wherein a trip protection circuit is provided on the surface of the circuit board which comprises a loudspeaker LS1 and a silicon controlled rectifier VD1, one end of the loudspeaker LS1 is connected with one end of a resistor R1 and one end of a resistor R2, an other end of the resistor R2 is connected with an other end of the resistor R1 and one of the two ends of the connecting wire, an other end of the loudspeaker LS1 is connected with a positive electrode of the silicon controlled rectifier VD1, a negative electrode of the silicon controlled rectifier VD1 is connected with a negative electrode of a power supply E, a positive electrode of the power supply E is connected with one end of a switch S1, an other end of the switch S1 is connected with one end of the loudspeaker LS1 and the resistor R1, and a control electrode of the silicon controlled rectifier VD1 is connected with an other one of the two ends of the connecting wire and one end of the resistor R2.

\* \* \* \* \*